(12) United States Patent
Wersland et al.

(10) Patent No.: US 10,945,915 B2
(45) Date of Patent: Mar. 16, 2021

(54) PORTABLE PERCUSSIVE MASSAGE DEVICE

(71) Applicant: Theragun, Inc., Beverly Hills, CA (US)

(72) Inventors: Jason Wersland, Manhattan Beach, CA (US); Benjamin Nazarian, Beverly Hills, CA (US); Jaime Sanchez Solana, Los Angeles, CA (US); Eduardo Merino, Beverly Hills, CA (US)

(73) Assignee: THERAGUN, INC., Beverly Hills, CA (US)

( * ) Notice: Subject to any disclaimer, the term of this patent is extended or adjusted under 35 U.S.C. 154(b) by 0 days.

(21) Appl. No.: 16/824,328

(22) Filed: Mar. 19, 2020

(65) Prior Publication Data

US 2020/0352821 A1 Nov. 12, 2020

Related U.S. Application Data (63) Continuation-in-part of application No. 29/708,815, filed on Oct. 9, 2019.

(Continued)

(51) Int. Cl.
*A61H 23/00* (2006.01)
*A61H 23/02* (2006.01)

(52) U.S. Cl.
CPC ....... *A61H 23/006* (2013.01); *A61H 23/0254* (2013.01); *A61H 2023/002* (2013.01); *A61H 2201/0153* (2013.01)

(58) Field of Classification Search
CPC .... A61H 23/00; A61H 23/002; A61H 23/004; A61H 23/006; A61H 23/0254;
(Continued)

(56) References Cited

U.S. PATENT DOCUMENTS

| 1,594,636 A | 8/1926 | Smith |
| 1,784,301 A | 12/1930 | Mekler |

(Continued)

FOREIGN PATENT DOCUMENTS

EP 1728494 A1 * 12/2006 ......... A61H 15/0085

OTHER PUBLICATIONS

Machine Translation of EP-1728494-A1 provided by Espacenet (Year: 2006).*

(Continued)

*Primary Examiner* — Kendra D Carter
*Assistant Examiner* — Brian T Khong
(74) *Attorney, Agent, or Firm* — Jeffer Mangels; Butler & Mitchell LLP; Brennan C. Swain, Esq.

(57) ABSTRACT

A percussive massage device that includes a housing that defines a housing interior, a battery, a motor positioned in the housing, a switch for activating the motor, and a reciprocating shaft operatively connected to the motor and configured to reciprocate in response to activation of the motor. The reciprocating shaft includes a distal end that defines a reciprocation axis. The housing includes a first side portion and a second side portion that cooperate to define the housing interior and are defined on opposite sides of the reciprocation axis. The motor is positioned in the first side portion and the battery is positioned in the second side portion.

16 Claims, 8 Drawing Sheets

Related U.S. Application Data (60) Provisional application No. 62/899,098, filed on Sep. 11, 2019, provisional application No. 62/844,424, filed on May 7, 2019.

(58) Field of Classification Search
CPC ............ A61H 23/0263; A61H 23/0218; A61H 23/008; A61H 2201/0153; A61H 2201/0157; A61H 2201/0165; A61H 2201/1669; A61H 2201/1671; A61H 2201/1664; A61H 2201/1657; A61H 7/001; A61H 7/002; A61H 7/003; A61H 7/004; A61H 7/005; A61H 9/00; A61H 9/0007; A61H 9/0021; A61H 1/008; A61H 15/0085; A61H 15/0092
USPC ........................ D24/211, 212, 213, 214, 215
See application file for complete search history.

(56) References Cited

U.S. PATENT DOCUMENTS

| | | |
|---|---|---|
| 3,968,789 A | 7/1976 | Simoncini |
| 4,088,128 A * | 5/1978 | Mabuchi ............ A61H 23/0254 601/101 |
| 4,513,737 A * | 4/1985 | Mabuchi ............ A61H 23/0254 601/101 |
| 4,565,189 A * | 1/1986 | Mabuchi ............ A61H 23/0254 601/93 |
| 4,566,442 A * | 1/1986 | Mabuchi ............ A61H 23/0254 601/101 |
| 4,691,693 A | 9/1987 | Sato |
| 4,730,605 A * | 3/1988 | Noble ................. A61H 23/0263 601/110 |
| 4,841,955 A * | 6/1989 | Evans ................ A61H 23/0218 601/101 |
| 4,989,613 A | 2/1991 | Finkenberg |
| 5,088,474 A * | 2/1992 | Mabuchi ................ A61H 7/001 601/110 |
| D329,291 S | 9/1992 | Wollman |
| D329,292 S | 9/1992 | Wollman |
| D331,467 S | 12/1992 | Wollman |
| 5,656,018 A * | 8/1997 | Tseng ................. A61H 15/0085 601/112 |
| D388,175 S | 12/1997 | Lie |
| D408,543 S * | 4/1999 | Back ........................... D24/211 |
| 5,925,002 A * | 7/1999 | Wollman ............ A61H 23/0263 601/46 |
| 5,935,089 A * | 8/1999 | Shimizu ............. A61H 23/0254 601/103 |
| D430,938 S | 9/2000 | Lee |
| 6,228,042 B1 * | 5/2001 | Dungan ................. A61H 1/008 601/101 |
| 6,290,660 B1 * | 9/2001 | Epps .................... A61H 23/008 601/103 |
| D448,852 S | 10/2001 | Engelen |
| 6,401,289 B1 | 6/2002 | Herbert |
| 6,432,072 B1 * | 8/2002 | Harris ................. A61H 23/0254 601/101 |
| D476,746 S | 7/2003 | Harris |
| 6,682,496 B1 * | 1/2004 | Pivaroff ................ A61H 7/005 601/101 |
| D531,733 S | 11/2006 | Burout, III |
| D553,252 S | 10/2007 | Masuda |
| D606,192 S | 12/2009 | Summerer |
| D649,657 S | 11/2011 | Petersen |
| D658,759 S | 5/2012 | Marescaux |
| 8,435,194 B2 | 5/2013 | Dverin |
| D703,337 S | 4/2014 | Fuhr |
| D706,433 S | 6/2014 | Fuhr |
| D708,742 S | 7/2014 | Dallemagne |
| D734,863 S | 7/2015 | Hennessey |
| D735,348 S | 7/2015 | Hennessey |
| D759,237 S | 6/2016 | Heath |
| D759,238 S | 6/2016 | Heath |
| D763,442 S | 8/2016 | Price |
| D778,439 S | 2/2017 | Hakansson |
| D819,221 S | 5/2018 | Lei |
| D823,478 S | 7/2018 | Park |
| D837,395 S | 1/2019 | Gan |
| D838,378 S | 1/2019 | Cao |
| D840,547 S | 2/2019 | Harle |
| D842,491 S | 3/2019 | Fleming |
| D843,656 S | 3/2019 | Zhang |
| D844,896 S | 4/2019 | Levi |
| D847,362 S | 4/2019 | Tang |
| D847,364 S | 4/2019 | Lee |
| D847,990 S | 5/2019 | Kimball |
| 10,314,762 B1 | 6/2019 | Marton |
| 10,357,425 B2 | 7/2019 | Wersland |
| D855,822 S | 8/2019 | Marton |
| 2001/0027280 A1 * | 10/2001 | Huang .......................... 601/108 |
| 2002/0115947 A1 * | 8/2002 | Young ................ A61H 23/0254 601/70 |
| 2002/0177795 A1 | 11/2002 | Frye |
| 2002/0183668 A1 * | 12/2002 | Huang ................ A61H 23/0254 601/97 |
| 2002/0188233 A1 | 12/2002 | Denyes |
| 2003/0014079 A1 * | 1/2003 | Tucek ..................... A61H 1/008 606/239 |
| 2003/0028134 A1 * | 2/2003 | Lev .......................... A61H 7/001 601/110 |
| 2003/0195443 A1 | 10/2003 | Miller |
| 2004/0176710 A1 * | 9/2004 | Kennedy ................. A61H 23/04 601/55 |
| 2005/0131461 A1 | 6/2005 | Tucek |
| 2006/0047315 A1 * | 3/2006 | Colloca ................. H01F 7/1607 606/239 |
| 2006/0116614 A1 | 6/2006 | Jones |
| 2006/0211961 A1 | 9/2006 | Meyer |
| 2007/0150004 A1 * | 6/2007 | Colloca .............. A61H 23/0218 606/238 |
| 2010/0100119 A1 * | 4/2010 | Herndon ............ A61H 23/0254 606/201 |
| 2010/0137907 A1 * | 6/2010 | Tsai ........................ A61H 23/00 606/238 |
| 2010/0145242 A1 | 6/2010 | Tsai |
| 2010/0160841 A1 | 6/2010 | Wu |
| 2010/0274162 A1 | 10/2010 | Evans |
| 2012/0197357 A1 | 8/2012 | Dewey |
| 2013/0030506 A1 | 1/2013 | Bartolone |
| 2013/0116503 A1 * | 5/2013 | Mertens ................. A61H 7/007 600/38 |
| 2014/0221887 A1 | 8/2014 | Wu |
| 2015/0119771 A1 | 4/2015 | Roberts |
| 2016/0192814 A1 * | 7/2016 | Kang ....................... A47K 7/04 15/21.1 |
| 2017/0042754 A1 * | 2/2017 | Fowers ................... A61H 7/001 |
| 2018/0154141 A1 | 6/2018 | Ahn |
| 2019/0175434 A1 | 6/2019 | Zhang |
| 2019/0254921 A1 * | 8/2019 | Marton .............. A61H 23/0254 |
| 2019/0254922 A1 | 8/2019 | Marton |
| 2020/0069510 A1 | 3/2020 | Wersland |
| 2020/0085675 A1 * | 3/2020 | Lee ............................ A61H 1/00 |

OTHER PUBLICATIONS

Amazon, "Theragun G3PRO Percussive Therapy Device", Feb. 13, 2019. https://www.amazon.com/dp/B07MJ2MCT3/ref=nav_timeline_asin?_encoding=UTF8&psc=1. Shown on p. 1 (Year: 2019).

\* cited by examiner

PORTABLE PERCUSSIVE MASSAGE DEVICE

CROSS REFERENCE TO RELATED APPLICATIONS

This application is a continuation-in-part of U.S. patent application Ser. No. 29/708,815, filed Oct. 9, 2019 and also claims priority to U.S. Provisional Patent Application No. 62/899,098, filed Sep. 11, 2019, and U.S. Provisional Patent Application No. 62/844,424, filed May 7, 2019, the entireties of which are incorporated by reference herein.

FIELD OF THE INVENTION

The present invention relates generally to a percussive massage device, and more particularly to a portable percussive massage device.

BACKGROUND OF THE INVENTION

Percussive massage devices have become increasingly popular in recent years. However, they often can be bulky and difficult to transport in a gym bag or the like.

SUMMARY OF THE PREFERRED EMBODIMENTS

In accordance with a first aspect of the present invention there is provided a percussive massage device that includes a housing that defines a housing interior, a battery, a motor positioned in the housing, a switch for activating the motor, and a reciprocating shaft operatively connected to the motor and configured to reciprocate in response to activation of the motor. In a preferred embodiment, the reciprocating shaft includes a distal end that defines a reciprocation axis. The housing includes a first side portion and a second side portion that cooperate to define the housing interior and are defined on opposite sides of the reciprocation axis. The motor is positioned in the first side portion and the battery is positioned in the second side portion. Preferably, the first side portion and second side portion are generally symmetrical. In a preferred embodiment, the housing defines a housing axis, and the reciprocation axis and the housing axis are co-axial. In a preferred embodiment, the motor includes a rotatable motor shaft that defines a motor axis that is perpendicular to the reciprocation axis and extends through the battery.

In a preferred embodiment, the percussive massage device includes a motor mount bracket that includes a middle member having first and second opposite sides. The motor is positioned on the first side of the middle member and the reciprocating shaft is positioned on the second side of the middle member. Preferably, the middle member includes a shaft opening defined therein and the motors rotatable motor shaft extends from the first side of the middle member, through the shaft opening and to the second side of the middle member. The reciprocating shaft is operatively connected to the motor shaft. In a preferred embodiment, the housing includes first and second housing halves. The motor mount bracket is secured to both of the first and second housing halves. Preferably, the motor mount bracket is secured to the first housing half via an interference fit and to the second housing half via threaded fasteners. In a preferred embodiment, the interference fit includes one of a tubular member and a securing post disposed on the housing and the other of the tubular member and the securing post disposed on the motor mount bracket, and the securing post is received in the tubular member.

In a preferred embodiment, the percussive massage device also includes a bush assembly through which the reciprocating shaft reciprocates. The bush assembly includes first and second dampening halves on opposite sides thereof that are positioned between the bush assembly and the housing. Preferably, the first and second dampening halves include securing protrusions extending outwardly therefrom that are received in securing opening defined in the housing.

In accordance with another aspect of the present invention there is provided a percussive massage device that includes a housing that defines a housing interior and a housing axis, a battery, a motor positioned in the housing, a switch for activating the motor, and a reciprocating shaft operatively connected to the motor and configured to reciprocate in response to activation of the motor. The motor includes a rotatable motor shaft that defines a motor axis that is perpendicular to the reciprocation axis and extends through the battery. The reciprocating shaft includes a distal end that defines a reciprocation axis. The housing includes a first side portion and a second side portion that cooperate to define the housing interior and are defined on opposite sides of the reciprocation axis. The motor is positioned in the first side portion and the battery is positioned in the second side portion. The first side portion and second side portion are generally symmetrical and the reciprocation axis and the housing axis are co-axial.

In accordance with another aspect of the present invention there is provided a method of using a percussive massage device that includes a housing that defines a housing interior, a battery, a motor positioned in the housing, a switch for activating the motor, and a reciprocating shaft operatively connected to the motor and configured to reciprocate in response to activation of the motor. The reciprocating shaft includes a distal end that defines a reciprocation axis. The method includes grasping the housing with a first hand having a palm, positioning the first hand such that the reciprocation axis extends through the palm, and massaging a first body part with a massage attachment removably connected to the distal end of the reciprocating shaft.

In a preferred embodiment, the housing includes a first side portion and a second side portion that cooperate to define the housing interior and are defined on opposite sides of the reciprocation axis and the motor is positioned in the first side portion and the battery is positioned in the second side portion.

In a preferred embodiment, the present invention is a percussive massage device that is more compact than many others taught in the prior art. In a preferred embodiment, the device includes a brushless motor that includes the necessary torque in a relatively small space. In a preferred embodiment, the device is shaped to ergonomically fit into a user's palm and the structure of the device is such that when the device is held in a user's hand, the user is placing generally linear force from their palm through the housing and to the massage member. Preferably, the outer housing tapers from the top toward the opening through which the reciprocal shaft extends.

In a preferred embodiment, the device includes a motor mount that includes threaded fasteners that connect to one side of the housing. The device includes a bush through which the shaft runs and a bush holder in which the bush resides. In a preferred embodiment, the device is small enough to fit in a ski jacket or a purse. Due to the symmetrical nature of the device, the weight distribution and compactness makes the device easy to use.

BRIEF DESCRIPTION OF THE DRAWINGS

Like numerals refer to like parts throughout the several views of the drawings.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-8 show embodiments of a portable percussive massage device 10 in accordance with a preferred embodiment of the present invention.

Figure 1:
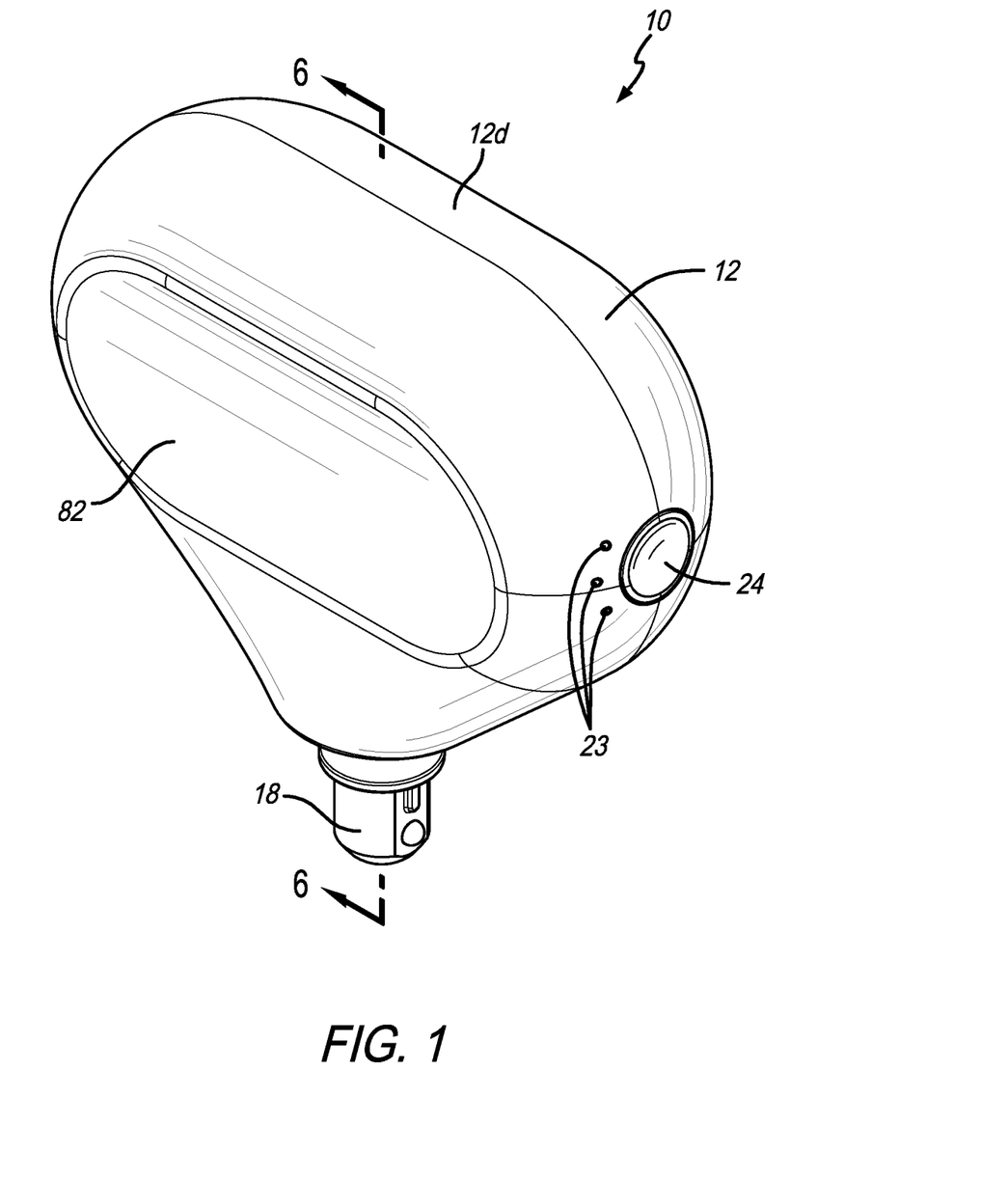
FIG. 1 is a perspective view of a portable percussive massage device in accordance with a preferred embodiment of the present invention.
Figure 2:
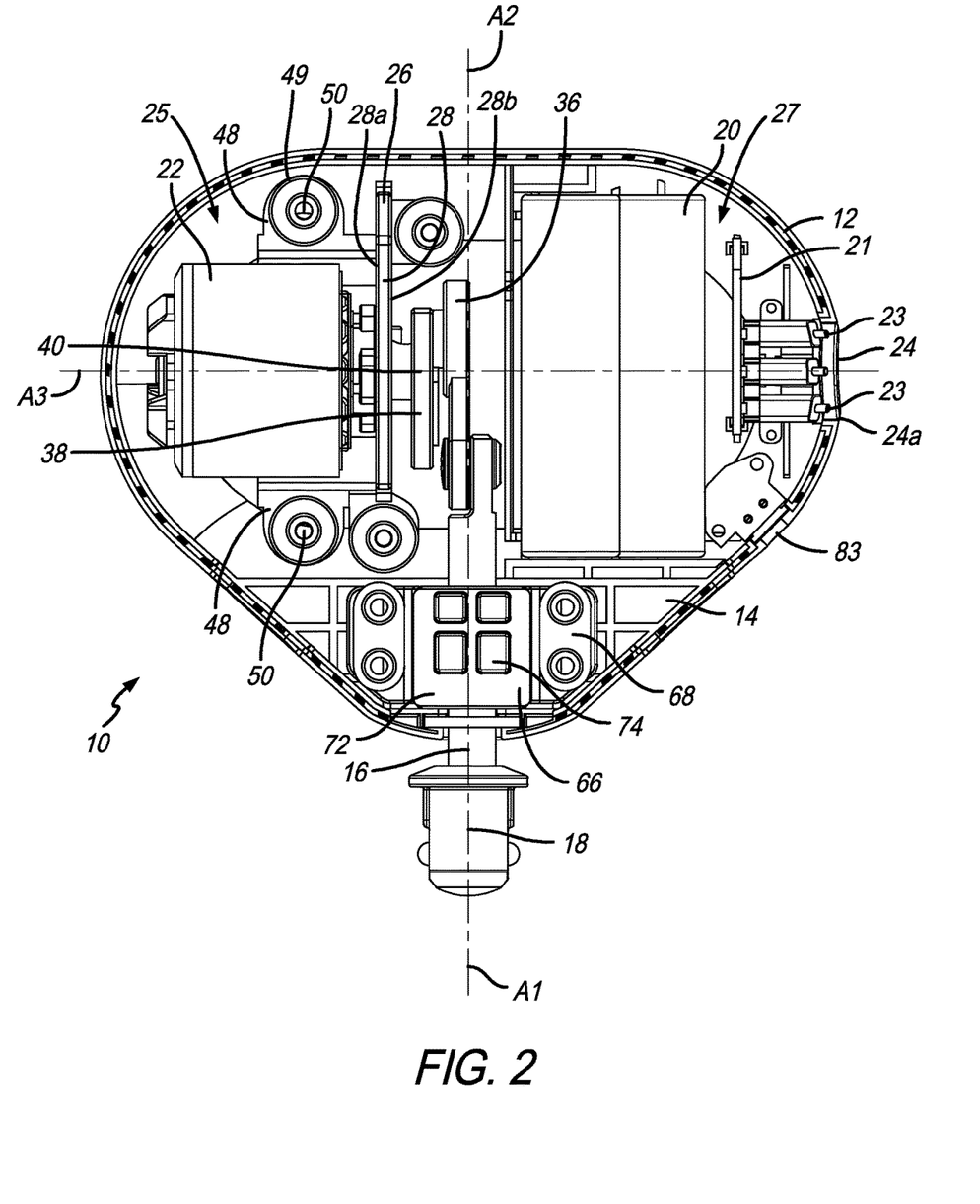
FIG. 2 is a front elevational view of the percussive massage device with one housing half removed.

As shown in FIGS. 1-2, in a preferred embodiment, the percussive massage device 10 generally includes a housing 12 that defines a housing interior 14, a reciprocating shaft 16 and an attachment member 18 (secured on the distal end 16*a* of the reciprocating shaft 16) for securing a massage member or attachment thereto. In a preferred embodiment, the device includes one of the attachment members 18 disclosed in U.S. Pat. No. 10,557,490 (the '490 patent), the entirety of which is incorporated herein by reference. The attachment member 18 is used to attach a treatment member or massage attachment 19 (see FIG. 8). The male attachment member 18 shown in the drawings is similar to the embodiment shown in FIGS. 11-13 in the '490 patent. However, the embodiments shown in any of FIGS. 1-10 in the '490 patent or any other system for connecting a massage attachment to a percussive massage device can also be used. For example, in another embodiment, the reciprocating shaft 16 can include a female attachment member that mates with a male attachment member on the massage attachment 19.

As shown in FIG. 2, the device 10 also includes a battery or batteries 20 (or other electrical source, such as an AC plug), a motor 22 positioned in the housing, and a switch 24 for activating the motor. In a preferred embodiment, the motor 22 is a brushless direct current (BLDC) motor. The motor 22 and is configured to vary the speed (i.e., rotational motion) that may be converted to reciprocal motion, as described below. In other embodiments, the motor is a brushed DC motor, a brushed AC motor, or a brushless AC motor. One of ordinary skill in the art would understand that choosing a brushless or brushed motor, or direct current or alternating current, may vary depending on the application and intended size, battery power, and use. The battery 20 is positioned in a battery recess 20*a* defined in the housing 12 and is electrically connected or communicated with the PCB 21, which controls the operation of the device 10. In a preferred embodiment, the switch 24 is a push button whose operation is controlled to turn the device on and off, change speeds, change modes, etc. The housing 12 can also include lights 23 that show status, such as on/off or which speed or mode the device is set to. A long push of the button 24 can turn the device on or off and short pushes of the button 24 can changes speeds or modes. The PCB 21 and associated controller are communicated with the motor 22. It will be appreciated that wiring is not shown in the drawings.

Figure 3:
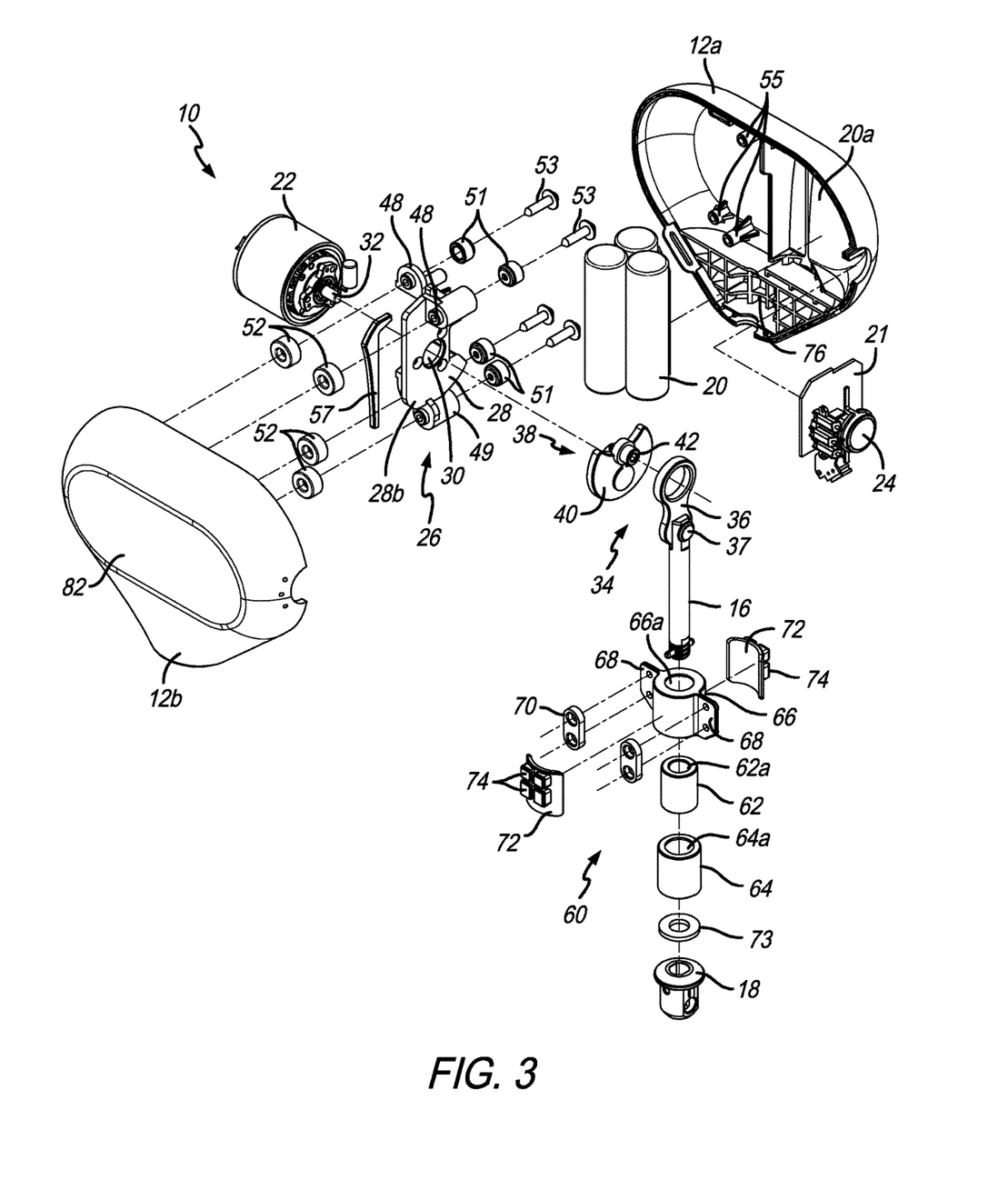
FIG. 3 is an exploded perspective view of the percussive massage device.
Figure 4:
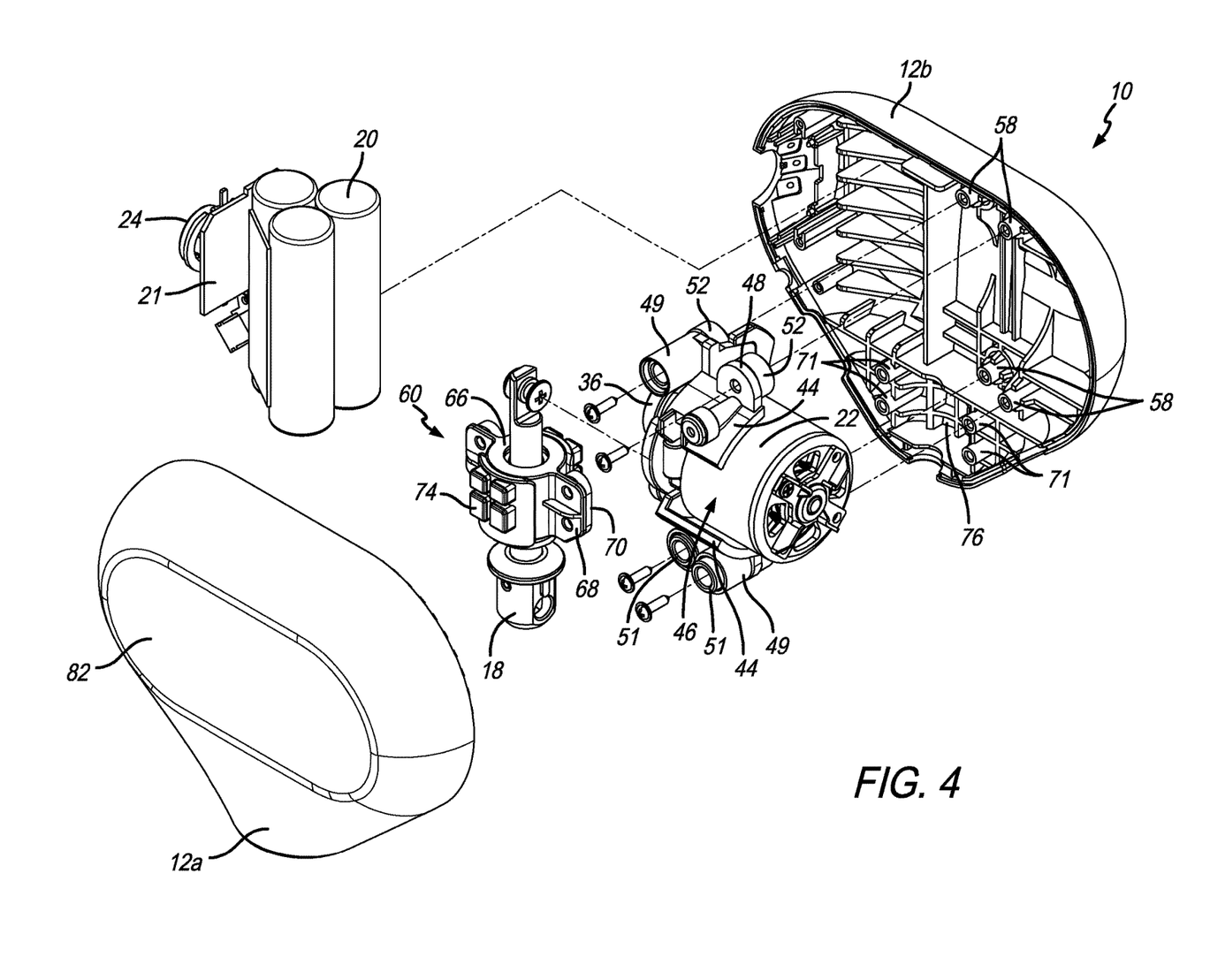
FIG. 4 is an exploded perspective view of the percussive massage device from the opposite side of FIG. 3.

As shown in FIGS. 2-4, in a preferred embodiment, the percussive massage device 10 includes a motor mount bracket 26 positioned in the housing interior 14. Preferably, the motor mount bracket 26 includes a middle member 28 having first and second opposite sides 28a and 28b. The motor 22 is positioned on the first side 28a and the reciprocating shaft 16 is positioned on the second side 28b of the middle member 28. The middle member 28 includes a shaft opening 30 defined therein. The motor 22 includes a rotatable motor shaft 32 extending therefrom that extends from the first side 28a of the middle member 28, through the shaft opening 30 and to the second side 28b of the middle member 28. Preferably, the motor 22 is secured to the motor mount bracket 26 via threaded fasteners. However, other attachments, such as welding, gluing, rivets, bolts and the like are within the scope of the present invention.

In a preferred embodiment, the motor mount bracket 26 includes flanges 44 extending from the middle member 28. The flanges 44 partially define a motor space 46 where at least a portion of the motor 22 is housed. The middle member 28 also includes a plurality of feet 48 extending therefrom that include tubular members 49 and securing openings 50 defined therein. Dampening rings 51 and dampening washers are also included. All dampening components herein are made of rubber, silicone or the like and are provided to prevent plastic to plastic or plastic to metal contact and to reduce noise and vibration.

As shown in FIGS. 3-4, dampening rings 51 are received in tubular members 49 on a first side of feet 48 and dampening washers 52 are positioned on the second side of the feet 58. Threaded fasteners 53 or the like extend through the dampening rings 51, tubular members 49, securing openings 50, dampening washers 52 and are received in threaded female securing members 58 on the inner surface of the second housing half 12b to secure the motor mount bracket 26 within the housing interior 14. Securing posts 55 (see FIG. 3) are received in the tubular members 49 and extend into tubular rings 51 to secure the motor mount 26 to the first housing half 12a. The securing posts 55 provide an interference fit with the tubular members 49 to secure the motor mount bracket 26 to the first housing half 12a. In a preferred embodiment, the securing posts 55 are tapered from the top or free end thereof (or include tapered flanges) to provide the interference fit with the tubular members. A dampening member 57 is positioned between the motor mount 26 and the second housing half 12b to prevent direct contact of the motor mount 26 against the second housing half 12b.

In a preferred embodiment, the rotation of the motor shaft 32 is converted to reciprocating motion of the reciprocating shaft 16 via a linkage assembly (or push rod assembly) 34 that includes a push rod 36 that is pivotably connected to the reciprocating shaft 16 (see pivot pin 37) and an offset member 38 that includes a counterweight 40. An offset shaft 42 extending from the offset member 38 is operatively connected (e.g., pivotably connected) to the push rod 36. It will be appreciated that the axis of the offset shaft 42 is offset from the axis of rotation of the motor shaft 32. In a preferred embodiment, the push rod 36 (or at least a majority thereof), offset member 38 and counterweight 40 are all positioned on the first side 14a of the housing interior 14 (i.e., on the same side of the housing interior as the motor.

As shown in FIGS. 3-4, the reciprocating shaft 16 extends through and reciprocates within a bush assembly 60, that generally includes a bush 62, dampening bush cover 64, washer 73 and bush holding structure 66. Bush 62 is received in the central opening 64a of dampening bush cover 64, which is received in the central opening 66a of bush holding structure 66. The reciprocating shaft 16 extends through the central opening 62a of bush 62. Dampening screw guides 70 and dampening halves 72 (which preferably have a curved shape) help damp the reciprocation of the reciprocating shaft 16 through the bush assembly 60. To connect the bush assembly 60 to the housing 12, threaded fasteners are extended through openings in the dampening screw guides, through openings in wings 68 extending from the bush holding structure 66 and into female securing members 71 (see FIG. 4). Dampening halves 72 are positioned between the bush assembly 60 and the housing halves 12a and 12b. Securing protrusions 74 extending from the dampening halves 72 extend into securing openings 76 defined in the housing halves 12a and 12b.

Figure 5:
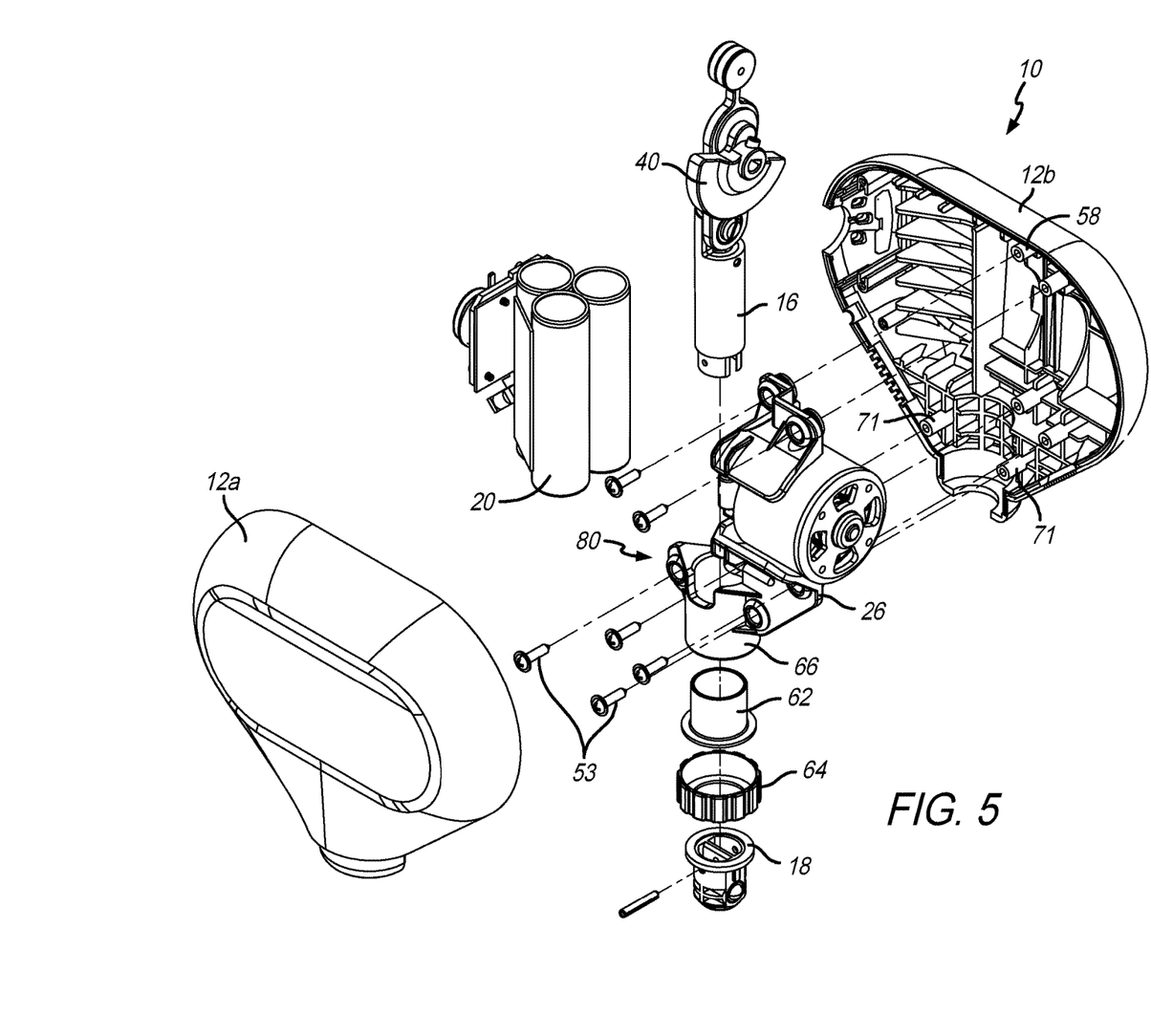
FIG. 5 is an exploded perspective view of a percussive massage device with a unitary motor mount bracket and bush holding structure.

FIG. 5 shows another embodiment, where the motor mount 26 and bush holding structure 66 are part of a unitary mounting structure 80. The remaining components are the same or similar to the embodiment discussed herein where the motor mount 26 and bush holding structure 66 are separate pieces.

Figure 6:
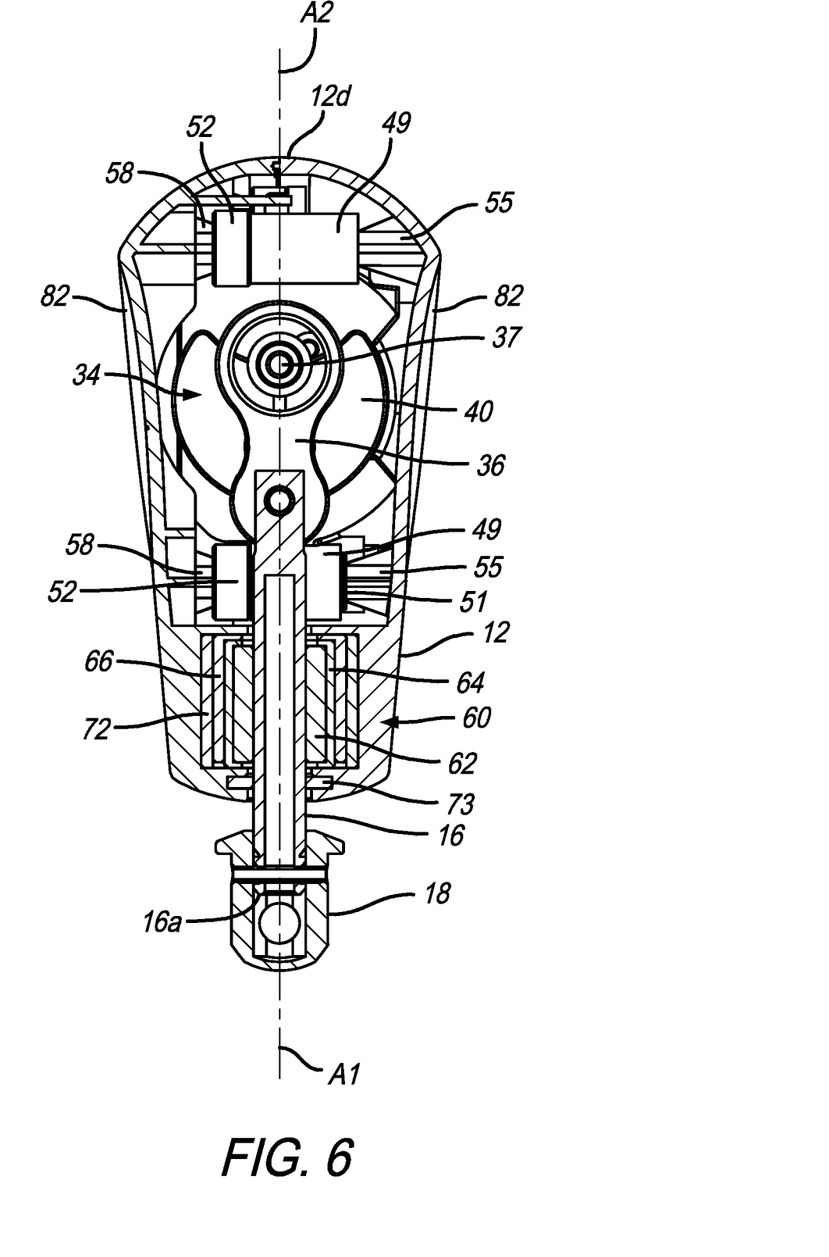
FIG. 6 is a cross-sectional side elevation taken along line 6-6 of FIG. 1.

As shown in FIGS. 2 and 6, in a preferred embodiment, the reciprocating shaft 16 includes a distal end that defines a reciprocation axis A1. The housing defines a housing axis A2. In a preferred embodiment, the reciprocation axis A1 and the housing axis A2 are co-axial. As shown in FIG. 2, the housing 12 includes a first side portion 25 and a second side portion 27 that cooperate to define the housing interior 14 and are defined on opposite sides of the reciprocation axis A1. Preferably, the motor 22 is positioned in the first side portion 25 and the battery 20 is positioned in the second side portion 27. Preferably, the motor and entire drive train, prior to the reciprocating shaft 16 (with respect to the drive train), is positioned in the first side portion 25 (i.e., on the first side of the reciprocation axis A1) and the battery 20, PCB 21 and associated electronic components (other than all wires) and the switch 24 are all located in the second side portion 27 (i.e., on the second side of the reciprocation axis A1). As shown in FIG. 2, the motor shaft 32 defines a motor axis A3. In a preferred embodiment, the motor axis A3 is perpendicular to the reciprocation axis A1 and extends through the battery 20. The motor axis A3 can also be co-axial with the switch 24.

Figure 7:
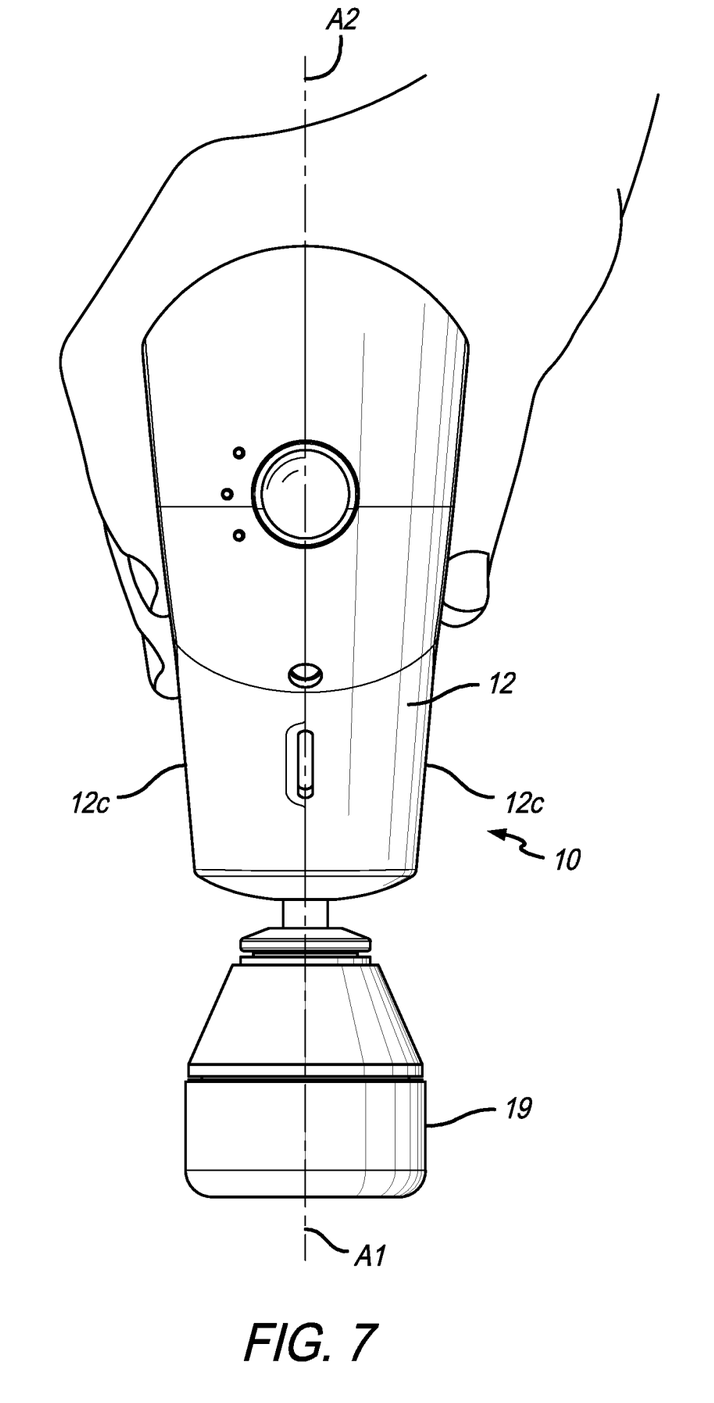
FIG. 7 is a side elevational view of the percussive massage device being grasped by a user.
Figure 8:
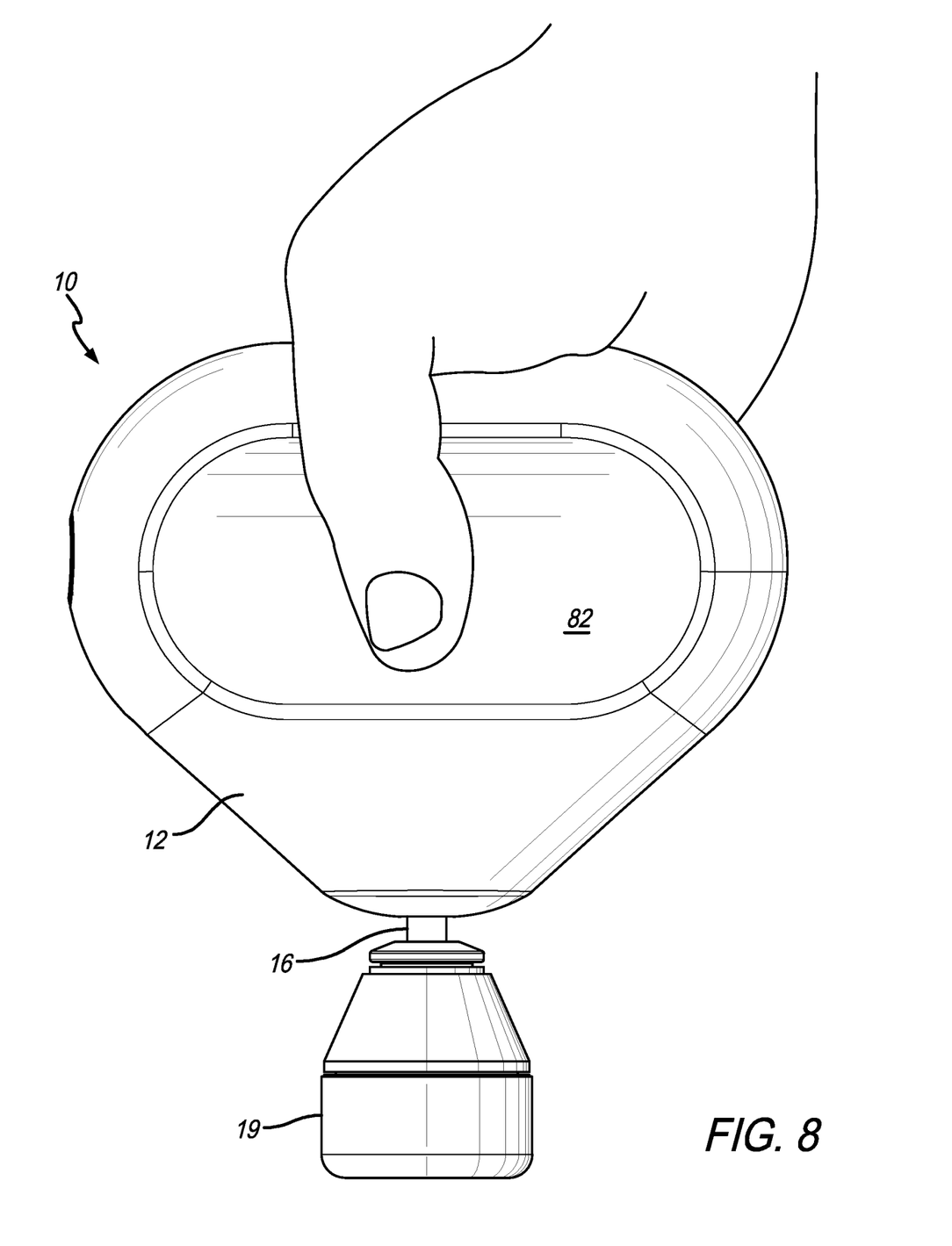
FIG. 8 is a rear elevational view of the percussive massage device being grasped by a user.

In use, a user grasps the device by placing their hand, and, in particular, their palm against the top 12d of the housing (as shown in FIGS. 7 and 8) at a position wherein the reciprocation axis A1 extends through their palm. This allows the user to provide a push force in line with the reciprocation axis A1. The user can then use the device to massage one or more body parts with the removably attached massage attachment and to change attachments as desired. The device can be gripped differently if desired. It will be appreciated that the device can be paired As shown in FIGS. 7 and 8, the device 500 is preferably shaped to ergonomically fit into a user's palm. Preferably, the outer surface 12c of the housing 12 tapers (front, back, left side and right side) from the top toward the opening 84 through which the reciprocal shaft 16 extends. In another embodiment, the reciprocal shaft 16 may be completely retained within the housing 12 and does not extend through opening 84. In this embodiment, the reciprocal shaft 16 includes a female attachment member on the distal end thereof and the massage attachment 19 includes a male attachment member that extends through opening 84 and mates with the reciprocal shaft 16.

In a preferred embodiment, the housing 12 includes finger recesses 82 on opposite sides where a user can place their fingers on one side and thumb on the other side, as shown in FIGS. 7 and 8. In a preferred embodiment, the percussive massage device 10 and housing 12 are generally symmetrical both left and right (as shown in FIGS. 2 and 8) and front and back (as shown in FIGS. 6 and 7). As shown in FIG. 2, due to the button 24 and the opening 24a therefor and the charging port 83, the device is not completely symmetrical left to right. This meets the definition of "generally symmetrical." Similar openings and additions fall within the definition of generally symmetrical.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers or dimensions noted herein are only examples: alternative implementations may employ differing values, measurements, dimensions or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such

What is claimed is:

1. A percussive massage device comprising:
   a housing that defines a housing interior, wherein the housing defines a thickness,
   a width and a height,
   a battery,
   a motor positioned in the housing, wherein the motor includes a rotatable motor shaft that defines a motor axis,
   a counterweight that rotates about the motor axis,
   a switch for activating the motor, and
   a reciprocating shaft operatively connected to the motor and configured to reciprocate in response to activation of the motor, wherein the reciprocating shaft includes a distal end that defines a reciprocation axis, wherein the reciprocation axis defines a thickness reciprocation plane that extends transversely through the thickness of the housing and divides the housing into first and second side portions, wherein the entire motor is positioned on a first side of the thickness reciprocation plane in the first side portion and the entire battery is positioned on a second side of the thickness reciprocation plane in the second side portion, wherein the motor axis extends perpendicular to the thickness reciprocation plane and extends through the battery, and wherein the first side portion is symmetrical to the second side portion except for any openings or ports defined in the housing.

2. The percussive massage device of claim 1, wherein the housing defines a housing axis, and wherein the reciprocation axis and the housing axis are co-axial.

3. The percussive massage device of claim 1, further comprising a motor mount bracket that includes a middle member having first and second opposite sides, wherein the motor is positioned on the first side of the middle member and the reciprocating shaft is positioned on the second side of the middle member.

4. The percussive massage device of claim 3, wherein the middle member includes a shaft opening defined therein, wherein the motor includes a rotatable motor shaft extending therefrom that extends from the first side of the middle member, through the shaft opening and to the second side of the middle member, wherein the reciprocating shaft is operatively connected to the motor shaft.

5. The percussive massage device of claim 4, wherein the housing includes first and second housing halves, wherein the motor mount bracket is secured to both of the first and second housing halves.

6. The percussive massage device of claim 5, wherein the motor mount bracket is secured to the first housing half via an interference fit and to the second housing half via threaded fasteners.

7. The percussive massage device of claim 6, wherein the interference fit comprises one of a tubular member and a securing post disposed on the housing and the other of the tubular member and the securing post disposed on the motor mount bracket, and wherein the securing post is received in the tubular member.

8. The percussive massage device of claim 1, further comprising a bush assembly through which the reciprocating shaft reciprocates, wherein the bush assembly includes a bush and first and second dampening halves that are positioned on opposite sides of the bush and are positioned between the bush and the housing.

9. The percussive massage device of claim 8, wherein the first and second dampening halves include securing protrusions extending outwardly therefrom that are received in securing openings defined in the housing.

10. The percussive massage device of claim 1, wherein the reciprocation axis defines a width reciprocation plane that extends through the width of the housing to divide the housing into front and back portions, and wherein the width reciprocation plane is perpendicular to the thickness reciprocation plane.

11. A percussive massage device comprising:
a housing that defines a housing interior and a housing axis, wherein the housing defines a thickness, a width and a height,
a battery,
a motor positioned in the housing, wherein the motor includes a rotatable motor shaft that defines a motor axis,
a counterweight that rotates about the motor axis,
a switch for activating the motor, and
a reciprocating shaft operatively connected to the motor and configured to reciprocate in response to activation of the motor, wherein the reciprocating shaft includes a distal end that defines a reciprocation axis, wherein the motor axis is perpendicular to the reciprocation axis and extends through the battery, wherein the reciprocation axis defines a thickness reciprocation plane that extends transversely through the thickness of the housing and divides the housing into first and second side portions, wherein the entire motor is positioned on a first side of the thickness reciprocation plane in the first side portion and the entire battery is positioned on a second side of the thickness reciprocation plane in the second side portion, wherein the first side portion is symmetrical to the second side portion except for any openings or ports defined in the housing, and wherein the reciprocation axis and the housing axis are co-axial.

12. The percussive massage device of claim 11, further comprising a motor mount bracket that includes a middle member having first and second opposite sides, wherein the motor is positioned on the first side of the middle member and the reciprocating shaft is positioned on the second side of the middle member, wherein the middle member includes a shaft opening defined therein, wherein the motor shaft extend extends from the first side of the middle member, through the shaft opening and to the second side of the middle member, wherein the reciprocating shaft is operatively connected to the motor shaft.

13. The percussive massage device of claim 12, wherein the housing includes first and second housing halves, wherein the motor mount bracket is secured to both of the first and second housing halves, wherein the motor mount bracket is secured to the first housing half via an interference fit and to the second housing half via threaded fasteners, wherein the interference fit comprises one of a tubular member and a securing post disposed on the housing and the other of the tubular member and the securing post disposed on the motor mount bracket, and wherein the securing post is received in the tubular member.

14. The percussive massage device of claim 13, further comprising a bush assembly that includes a bush through which the reciprocating shaft reciprocates, wherein the bush assembly includes first and second dampening halves on opposite sides thereof that are positioned between the bush assembly and the housing, wherein the first and second dampening halves include securing protrusions extending outwardly therefrom that are received in securing openings defined in the housing.

15. A method of using a percussive massage device that includes a housing that defines a housing interior, a battery, a motor having a rotatable motor shaft that defines a motor axis positioned in the housing, a counterweight that rotates about the motor axis, a switch for activating the motor, and a reciprocating shaft operatively connected to the motor and configured to reciprocate in response to activation of the motor, wherein the method comprises the steps of:
grasping the housing with a first hand having a palm, wherein the reciprocating shaft includes a distal end that defines a reciprocation axis, wherein the reciprocation axis defines a thickness reciprocation plane that extends transversely through the thickness of the housing and divides the housing into first and second side portions, wherein the entire motor is positioned on a first side of the thickness reciprocation plane in the first side portion and the entire battery is positioned on a second side of the thickness reciprocation plane in the second side portion, wherein the motor axis extends perpendicular to the thickness reciprocation plane and extends through the battery, and wherein the first side portion is symmetrical to the second side portion except for any openings or ports defined in the housing,
positioning the first hand such that the reciprocation axis extends through the palm, and
massaging a first body part with a massage attachment removably connected to the distal end of the reciprocating shaft.

16. The percussive massage device of claim 15, wherein the housing defines a housing axis, and wherein the reciprocation axis and the housing axis are co-axial.

* * * * *